(12) United States Patent
Sisney et al.

(10) Patent No.: US 8,988,663 B2
(45) Date of Patent: Mar. 24, 2015

(54) LASER RANGE FINDING

(71) Applicant: Raytheon Company, Waltham, MA (US)

(72) Inventors: Brent L. Sisney, Allen, TX (US); Bryan K. Hawk, Frisco, TX (US); Robert P. Francis, Lewisville, TX (US); James A. McIntosh, Sunnyvale, TX (US)

(73) Assignee: Raytheon Company, Waltham, MA (US)

( * ) Notice: Subject to any disclaimer, the term of this patent is extended or adjusted under 35 U.S.C. 154(b) by 79 days.

(21) Appl. No.: 13/746,590

(22) Filed: Jan. 22, 2013

(65) Prior Publication Data

US 2014/0204361 A1 Jul. 24, 2014

(51) Int. Cl.
| | |
|---|---|
| *G01C 3/08* | (2006.01) |
| *G01S 17/89* | (2006.01) |
| *G01S 17/02* | (2006.01) |
| *G01C 3/04* | (2006.01) |

(52) U.S. Cl.
CPC ............... *G01S 17/89* (2013.01); *G01S 17/023* (2013.01); *G01C 3/04* (2013.01); *G01C 3/08* (2013.01)
USPC ....... 356/5.01; 356/3.01; 356/4.01; 356/4.07; 356/5.09; 356/9; 356/625

(58) Field of Classification Search
CPC ......... G01S 7/497; G01S 17/10; G01S 17/89; G01S 7/487; G01C 3/08
USPC ......... 356/3.01, 4.01, 4.07, 5.01, 5.09, 9, 625
See application file for complete search history.

(56) References Cited

U.S. PATENT DOCUMENTS

| | | | |
|---|---|---|---|
| 5,296,924 A | * | 3/1994 | de Saint Blancard et al. ............... 348/118 |
| 5,623,335 A | | 4/1997 | Bamberger |
| 6,023,322 A | | 2/2000 | Bamberger |
| 6,115,511 A | * | 9/2000 | Sakai et al. .................... 382/312 |
| 8,369,595 B1 | * | 2/2013 | Derakhshani et al. ........ 382/128 |
| 2002/0085193 A1 | * | 7/2002 | Ohtomo et al. .............. 356/4.01 |
| 2003/0043708 A1 | * | 3/2003 | Osanai et al. .............. 369/44.25 |
| 2004/0119020 A1 | * | 6/2004 | Bodkin .......................... 250/353 |
| 2005/0057745 A1 | | 3/2005 | Bontje |
| 2011/0187854 A1 | * | 8/2011 | Chung .......................... 348/135 |
| 2012/0008869 A1 | * | 1/2012 | Roth ............................. 382/225 |

FOREIGN PATENT DOCUMENTS

| | | |
|---|---|---|
| EP | 2405237 A1 | 1/2012 |
| EP | 2466256 A1 | 6/2012 |

* cited by examiner

*Primary Examiner* — Isam Alsomiri
*Assistant Examiner* — Samantha K Abraham
(74) *Attorney, Agent, or Firm* — Burns & Levinson, LLP; Joseph M. Maraia; Nikhil Patel

(57) ABSTRACT

Using a hand-held range finding device to range an object in a field of view is difficult due to user-induced jitter. In particular, user-induced jitter introduces uncertainty as to which object in a field of view is actually ranged. Current approaches attempt to mitigate user-induced jitter by requiring a user to mount the hand-held range finding device onto a stabilizing device (e.g., a tripod). However, such approaches require the user to carry additional equipment. Embodiments of the present disclosure enable the user to visually confirm which object in a field of view is actually ranged during a range finding event by generating a composite image that includes a visual representation of a laser pulse emitted by the range finding device reflecting off an object in the field of view. Advantageously, disclosed embodiments provide true hand-held range finding capabilities without requiring the use of stabilization assistance techniques.

17 Claims, 11 Drawing Sheets

LASER RANGE FINDING

BACKGROUND

A laser range finding device is a device that is used to determine the distance of an object from an observer (e.g., a user of the laser range finding device). The laser range finding device can be used, for example, to sight a gun or focus a camera.

Generally, a laser range finding device determines the distance to an object by emitting a laser pulse and receiving reflected energy in response to the emitted laser pulse reflecting off of an object. The laser range finding device collects and analyzes information associated with the emitted laser pulse and received reflected energy. For instance, the laser range finding device determines a time the laser pulse is emitted and a time the reflected energy is received. Based on the collected information, the laser range finding device calculates a distance between the laser range finding device and an object from which the reflected energy is received. For example, the laser range finding device determines a time difference between the time the laser pulse is emitted and the time the reflected energy is received. The laser range finding device then multiplies the determined time difference by the speed of light to calculate an estimated distance from the laser range finding device to the object from which the reflected energy is received.

SUMMARY

Embodiments of the present disclosure include methods, systems, or computer readable medium, with program codes embodied thereon, for determining the distance of a target object using a laser range finding device. One embodiment is a method that includes emitting at least one laser pulse toward the target object. The method also includes receiving reflected energy in response to the at least one laser pulse reflecting off a surface. The surface is associated with at least the target object or another object in the area surrounding the target object. In addition, the method includes capturing an image that includes the target object and an area surrounding the target object. Further, the method includes mapping a location associated with the at least one laser pulse reflecting off the surface to a coordinate corresponding to a coordinate system of the captured image. Also, the method includes generating a composite image for each captured image, the composite image including a visual representation of the at least one laser pulse overlaid on the captured image using the mapping of the location of the at least one laser pulse.

The method can further include displaying the composite image. The method can also include, based on information associated with the emission and reflected energy of the at least one laser pulse, calculating a distance between a geographical location of the laser range finding device and a geographical location of the surface and display the calculated distance on the composite image with the visual representation of the reflection.

In addition, the method can include determining a targeting reticle's coordinate with respect to the coordinate system of the captured image at the time of capturing the image. In this example, the targeting reticle is used to aim the laser range finding device toward the target object. Further, the method, in this example, includes using the targeting reticle's coordinate as the coordinate of the location associated with the at least one laser pulse reflecting off the surface.

In another example, the method can include capturing the image wherein the captured image further includes an image of the at least one laser pulse reflecting off the surface (e.g., reflected energy) and determining a coordinate of a location of the at least one laser pulse with respect to the coordinate system of the captured image.

The method can also include displaying the composite image with a selectable marking a user can select to designate that a source of the reflected energy corresponds to the surface of the target object.

In yet another example, the method can also include collecting information corresponding to movement of the laser range finding device between the capture of at least two images, wherein the information is collected via at least one of the following: motion sensors and image processing. Further, the method can include determining an offset between the coordinate systems of the two images using the collected information. In addition, the method can include generating an aggregated composite image of the at least two images using the determined offset between the at least two images. The method can also include displaying the aggregated composite image.

The method can include isolating a region of interest associated with a first captured image of a sequence of captured images. The method can also include comparing the region of interest associated with the first captured image with at least one selected region of the second image to determine a difference between at least one image parameter associated with the region of interest associated with the first image and the at least one selected region of the second image. The method can include selecting the at least one selected region of the second image based on an estimated offset between the first captured image and the second captured image. The estimated offset associated with movement of the laser range finding corresponds to movement of the laser range finding device between the capture of the first captured image and the second captured image. The method can also include overlaying one of the at least one selected region of the second image having a least difference between the at least one image parameter on the region of interest associated with the first captured image.

Another embodiment of the present disclosure is a laser range finding device for determining a distance to a target object. The laser range finding device includes a laser emitter configured to emit at least one laser pulse toward the target object. In addition, the laser range finding device includes a laser reflection receiver configured to receive reflected energy in response to the at least one laser pulse reflecting off a surface. The surface is associated with at least the target object or another object in an area surrounding the target object. Also, the laser range finding device includes a camera configured to capture an image that includes the target object and the area surrounding the target object. Further, the laser range finding device includes a mapping processor configured to map a location associated with the at least one laser pulse reflecting off the surface to a coordinate corresponding to a coordinate system of the captured image. Also, the laser range finding device comprises an image processor configured to generate a composite image for each captured image, the composite image including a visual representation of the at least one laser pulse overlaid on the captured image using the mapping of the location of the at least one laser pulse.

The laser range finding device can also include a display configured to display the composite image. In addition, the laser range finding device can include a distance ranging calculator configured to, based on information associated with the emission and reflected energy of the at least one laser pulse, calculate a distance between a geographical location of the laser range finding device and a geographical location of the surface. Also, the laser range finding device can include a display configured to display the calculated distance on the composite image with the visual representation of the reflection.

The mapping processor of the laser range finding device can be further configured to determine a targeting reticle's coordinate with respect to the coordinate system of the captured image at the time of capturing the image, wherein the targeting reticle is used to aim the laser range finding device toward the target object. The mapping processor can also be configured to use the targeting reticle's coordinate as the coordinate of the location associated with the at least one laser pulse reflecting off the surface.

The camera of the laser range finding device can be further configured to detect and capture a representation of the at least one laser pulse reflecting off the surface. In addition, the mapping processor can be further configured to determine a coordinate of a location of the representation with respect to the coordinate system of the captured image.

The display can be further configured to display a selectable marking a user can select to designate that a source of the reflected energy corresponds to the surface of the target object.

The laser range finding device can further include a sensor configured to collect information corresponding to movement of the laser range finding device between the capture of at least two images. Also, the laser range finding device of claim can include a jitter processor configured to determine an offset between the coordinate systems of the at least two images using the collected information. The image processor can be further configured to generate an aggregated composite image of the at least two images using the determined offset between the at least two images. The laser range finding device can also include a display for displaying the aggregated composite image.

In another example, the mapping processor further includes an isolation module configured to isolating a region of interest associated with a first captured image of a sequence of captured images. Also, the mapping processor can include a comparison module configured to comparing the region of interest associated with the first captured image with at least one selected region of the second image to determine a difference between at least one image parameter associated with the region of interest associated with the first image and at least one image parameter associated with the at least one selected regions of the second image. The at least one selected regions of the second image is selected based on an estimated offset between the first captured image and the second captured image. The estimated offset associated with movement of the laser range finding corresponds to movement of the laser range finding device between the capture of the first captured image and immediately prior to the capture of the second captured image. The image processor is further configured to overlay one of the at least one selected region of the second image having the least difference between the at least one image parameter on the region of interest associated with the first captured image.

Another example embodiment of the present disclosure includes a non-transitory computer readable medium having computer readable program codes embodied thereon for determining a distance to a target object, the computer readable program codes including instructions that, when executed by a processor, cause the processor to map a location associated with at least one laser pulse reflecting off a surface to a coordinate corresponding to a coordinate system of a captured image. The surface is associated with at least the target object or another object in an area surrounding the target object. The captured image includes at least the target object and the area surrounding the target object. The program codes also cause the processor to generate a composite image for each captured image. The composite image includes a visual representation of the at least one laser pulse overlaid on the captured image using the mapping of the location of the at least one laser pulse reflecting off the surface.

Advantageously, the disclosed embodiments provide true hand-held range finding capabilities without requiring the use of stabilization assistance techniques. For instance, using hand-held range finding devices to range find an object in a field of view is difficult due to user-induced jitter. Range finding an object becomes even more difficult when the object is relatively small and/or far away from the range finding device. In particular, user-induced jitter introduces uncertainty as to which object in a field of view is actually ranged. Current approaches attempt to mitigate user-induced jitter by requiring a user to mount the hand-held range finding device onto a tripod. However, such approaches require the user to carry additional equipment. Embodiments of the present disclosure enable the user to visually confirm which object in a field of view is actually ranged during a range finding event by generating a composite image that includes a visual representation of a laser pulse emitted by the range finding device. By using such visual confirmation techniques, the disclosed embodiments provide true hand-held range finding capabilities without requiring the use of stabilization assistance techniques.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

A description of example embodiments of the present disclosure follows.

Figure 1:
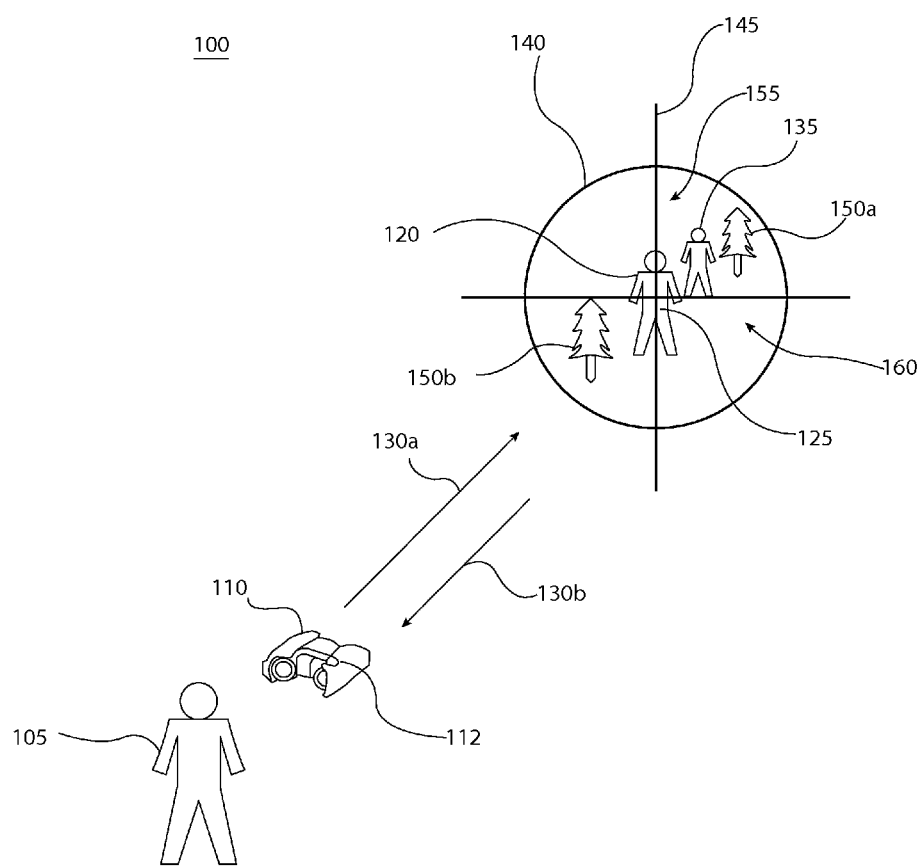
FIG. 1 is a schematic illustration of an environment in which a user utilizes a laser range finding device to determine the distance to a target object from the laser range finding device in accordance with an example embodiment of the present disclosure.

FIG. 1 is a schematic illustration of an environment 100 in which a user 105 utilizes a laser range finding device 110 to determine the distance to a target object 120 in accordance with an example embodiment of the present disclosure. The laser range finding device 110 includes an in-sight field of view 140. The field of view 140 presents a target area 155 to the user 105. The field of view 140 can be viewed with a digital display or view finder. In this example, the field of view 140 includes an overlaid targeting reticle 145 used to aim the laser range finding device at the target object 120 (e.g., hostile soldier), another object 135 (e.g., a civilian), and/or trees 150a-b.

In order to find the distance to the target object 120, the user 105 activates a function on the laser range finding device 110 which causes the laser range finding device 110 to emit at least one laser pulse 130a toward the target object 120. For instance, the user can depress a button 112 that fires a laser associated with the laser range finding device 110. Example embodiments of the present disclosure can utilize lasers known in the art such as a MegaWatt ER200 sold by SPIE of Bellingham, Wash. and Kigre MK-85 sold by Kigre, Inc. of Hilton Head, S.C. Subsequently, the laser range finding device receives reflected energy 130b in response to the at least one laser pulse 130a reflecting off an object in the field of view 140 (e.g., the surface 125 of target object 120).

One form of laser range finding operates on the time of flight principle. Such devices estimate distance to object by measuring the time it takes for a laser pulse to travel to the object and return to the device after reflecting off the object. The distance is calculated based on d=ct/2, where 'c' is the speed of flight and T is the time it takes the laser pulse to travel to the object and return to the device. Other range finding technologies include interferometry and multiple frequency phase-shifting.

Also, the laser range finding device 110 includes a camera (e.g., camera 515 of FIG. 5) that is configured to capture an image corresponding to the field of view 140. In particular, the captured image includes the target object 120 and the area surrounding the target object 160. In response to capturing the image corresponding to the field of view 140, the laser range finding device 110 maps a location associated with the at least one laser pulse reflecting off the surface 125 to a coordinate corresponding to a coordinate system of the captured image. For example, the laser range finding device 110 analyzes the captured image and creates a coordinate system corresponding to the captured image.

Figure 2A:
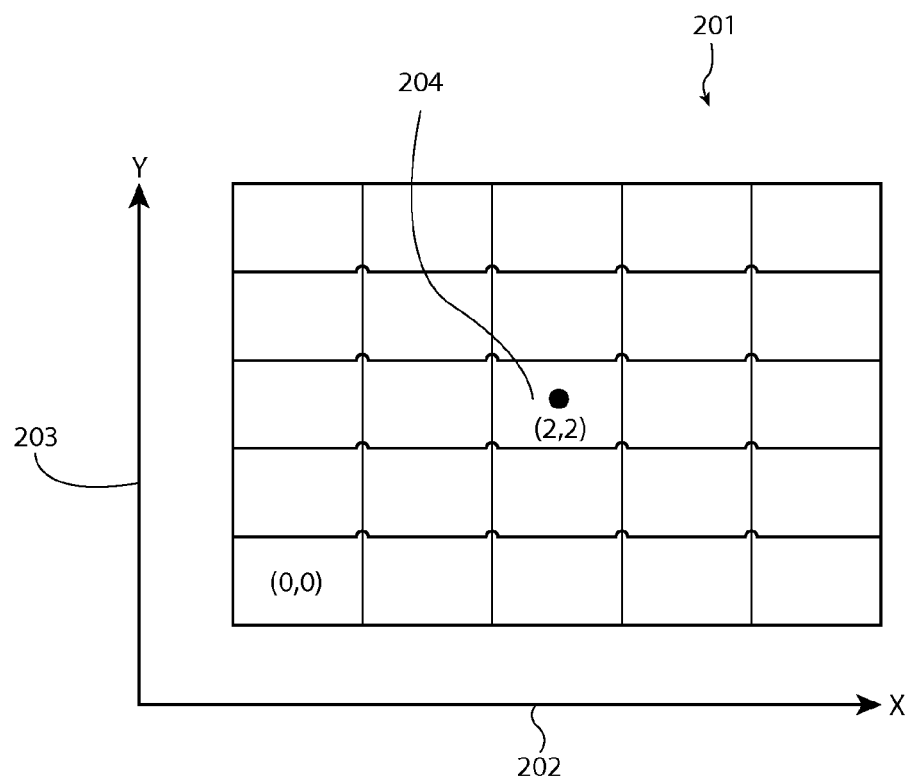
FIG. 2A is an illustration of a coordinate system corresponding to a captured image in accordance with an example embodiment of the present disclosure.

FIG. 2A illustrates a coordinate system 201 corresponding to a captured image. In the example illustrated in FIG. 2A, the captured image is a two-dimensional image. The coordinate system 201 of the captured image includes an axis for each dimension of the captured image. In this example, the x-axis 202 and the y-axis 203 represent respective dimensions of the captured image. The laser range finding device 110 defines the coordinate system 201 of the captured image using any method known or yet to be known in the art. In an example, the laser range finding device 110 can use each pixel of the captured image as a point in the coordinate system 201. The laser range finding device 110 then selects a point (e.g., a pixel) of the captured image and uses that point as the origin point of the coordinate system 201. In this example, the bottom left pixel is designated as the origin point. Once the laser range finding device 110 selects the origin point each point (e.g., pixel) of the image has a coordinate with respect to the origin point.

The laser range finding device 110 then determines a coordinate (e.g., coordinate 204) corresponding to a location associated with the laser pulse reflecting of the surface 125 of, for example, the target object 120 with respect to the coordinate system 201 corresponding to the captured image. In one example, the laser range finding device 110 determines the targeting reticle's 145 coordinate 204 with respect to the coordinate system 201 of the captured image at the time of capturing the image. The laser range finding device 110 then uses the targeting reticle's coordinate as the coordinate of the location associated with the at least one laser pulse reflecting off the surface.

In another example, the camera utilized by the laser range finding device can be configured to detect the reflected energy 130b. For example, the camera can include a sensor that is configured to sense a wavelength corresponding to the laser pulse that is emitted by the laser range finding device 110. Using such a sensor, the camera is able to capture the reflected energy 130b that corresponds to the at least one laser pulse reflecting off the surface 125, for example, of the target object 120 in the field of view 140. The laser range finding device 110 then determines a coordinate (e.g., coordinate 204) of a location of the reflected energy 130b with respect to the coordinate system of the captured image.

Figure 2B:
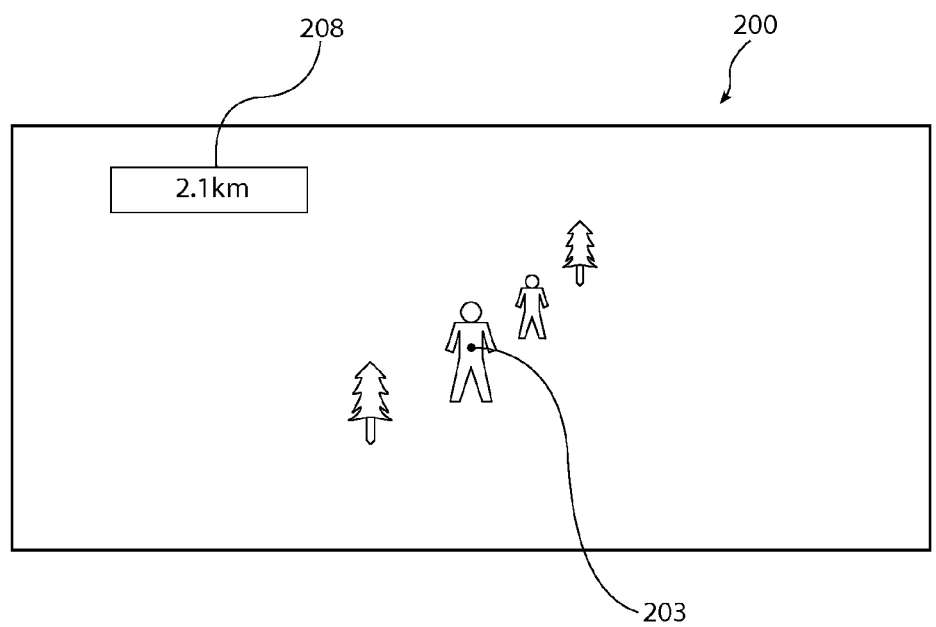
FIG. 2B is an illustration of a composite image displaying a visual representation of a laser pulse reflecting off a target object in accordance with an example embodiment of the present disclosure.

As illustrated in FIG. 2B, the laser range finding device 100 then generates a composite image 200 of the captured image. The composite image 200 includes a visual representation 203 of the at least one laser pulse overlaid on the captured image. The laser range finding device 110 overlays the visual representation 203 using the determined coordinate (e.g., coordinate 204) of the location reflected energy (e.g., reflected energy 130b of FIG. 1) with respect to the coordinate system of the captured image.

In addition, the laser range finding device 110, based on information associated with the emission and reflected energy of the at least one laser pulse, calculates a distance between a location (e.g., a geographical location) of the laser range finding device 110 and a location of the target object 120. Also, the laser range finding device can display the calculated distance 208 on the composite image with the visual representation 203 of the reflected energy.

In an example, the laser range finding device 110 determines the distance to an object (e.g., target object 210) by collecting information associated with an emitted laser pulse and received reflected energy corresponding to the emitted laser pulse. In particular, the laser range finding device 110 determines a time of emission of the emitted laser pulse and a time of detection of the corresponding reflected energy. Based on the collected information, the laser range finding device 110 calculates a distance between the laser range finding device 110 and an object from which the reflected energy is received. For instance, the laser range finding device 110 determines a time difference between the time the laser pulse is emitted and the time the reflected energy is received. The laser range finding device 110 then multiplies the determined time difference by the speed of light, and divides by two to account for travel to and from the target, to calculate the value of the distance from the laser range finding device 110 to the object (e.g., target object 120).

In some embodiments, the user 105 can cause the laser range finding device 110 to initiate several laser range finding events (e.g., emissions of a laser pulse 130a). This can occur due to the user 105 depressing a button (e.g., the button 112 of FIG. 1) corresponding to a function that activates a laser range finding event for an extended period of time. In another example, the user 105 can depress the button multiple times in order to cause multiple laser range finding events. In response to each laser range finding event, the laser range finding device 110 emits a laser pulse 130a and receives reflected energy 130b corresponding to the emitted laser pulse 130a. In addition, the laser range finding device 110, for each laser range finding event, captures an image of a scene in the field of view 140. For each captured image, the laser range finding device 110 creates a composite image that includes a visual representation of reflected energy 130b corresponding to a laser range finding event associated with the captured image.

As stated above, in hand-held applications, the user 105 can introduce jitter between each laser range finding event (e.g., emitted laser pulse 130a). Thus, reflected energy 130b received by the laser range finding device 110 can correspond to different objects in the field of view 140 between each laser range finding event. Accordingly, for each laser range finding event, the laser range finding device 110 displays a different calculated distance. As such, the user 105 may wish to confirm which of the displayed calculated distances corresponds to an object of interest (e.g., target object 120). The user 105 may wish to confirm this information in order to, for example, accurately focus a camera or sight a gun. Current approaches to mitigate user introduced jitter do not enable the user 105 to confirm which of the displayed calculated distances corresponds to the object of interest. Rather, current approaches only attempt to mitigate user introduced jitter by providing stabilization techniques. For example, such approaches require the user 105 to utilize a stabilization device (e.g., a tripod).

Embodiments of the present disclosure enable the user 105 to visually confirm which object in a field of view is actually ranged during a laser range finding event. In particular, embodiments of the present disclosure generate a composite image that includes a visual representation of a laser pulse emitted by the range finding device reflecting off an object in the field of view.

Figure 3A:
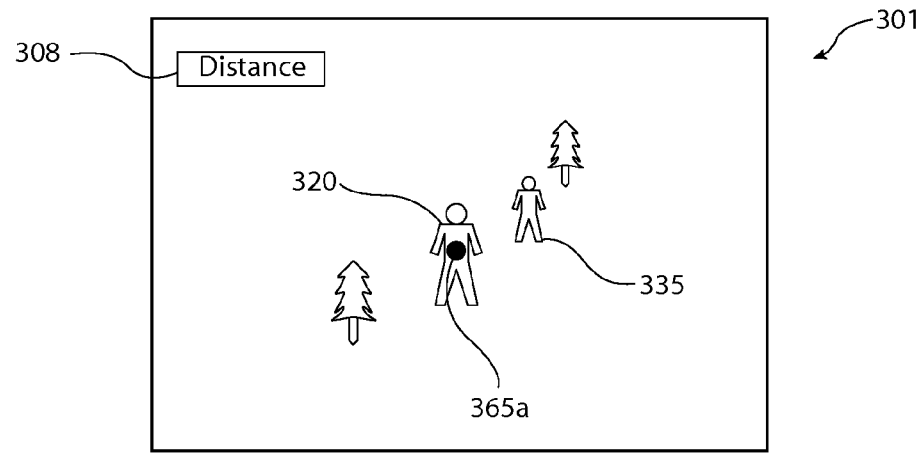
FIGS. 3A-B are additional illustrations of composite images that display a visual representation of a laser pulse reflecting off a target object in accordance with an example embodiment of the present disclosure.
Figure 3B:
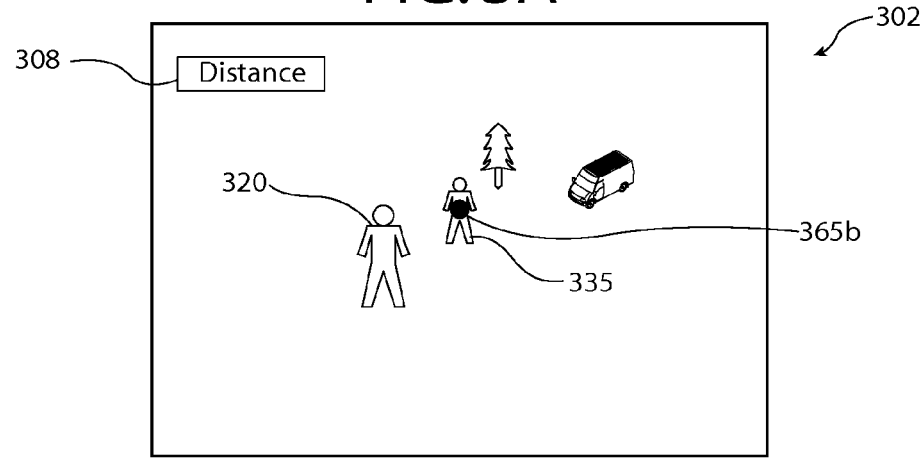

For example, FIGS. 3A-3B illustrate composite image 301 and composite image 302 generated in response to two different laser range finding events. As illustrated, the composite images 301, 302 include visual representations 365a-b. Each of the visual representations 365a-b correspond to two different objects from which reflected energy 130b is received by the laser range finding device 110 in each of two range finding events.

In an example, the laser range finding device 110 enables the user 105 to confirm which of the calculated distances corresponds to an object of interest to the user 105. For instance, the laser range finding device 110 enables the user 105 to select one of the composite images 301, 302 that includes a visual representation corresponding to a location at which an emitted laser pulse reflects off an object an of interest to the user 105 in the field of view 140. For instance, assuming an object of interest to the user 105 is object 320, the user selects composite image 301 because the visual representation 365a indicates that reflected energy is received from a laser pulse reflecting off of the surface of the object 320. Thus, a displayed calculated distance by the laser range finding device 110 associated with composite image 301 is an accurate distance between the user 105 and the object 320.

Figure 3C:
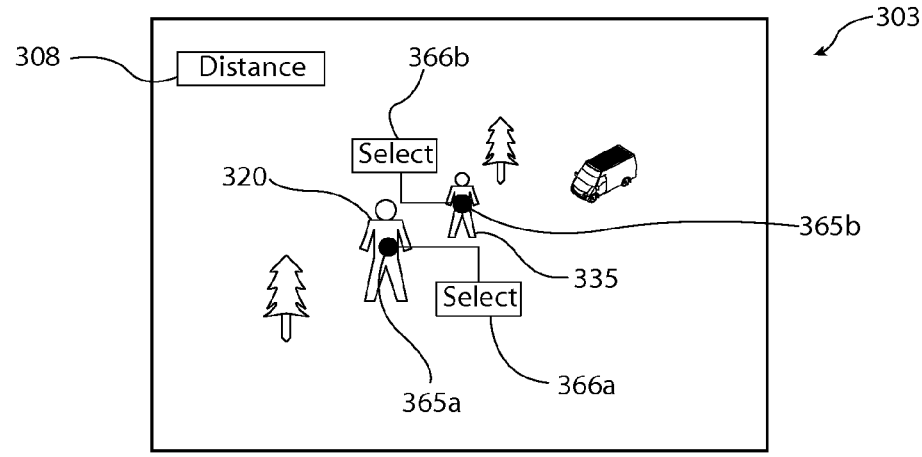
FIG. 3C is an illustration of an aggregated composite image generated from the composite images of FIGS. 3A-B.

In another example as illustrated in FIG. 3C, the laser range finding device 110 displays an aggregated composite image 303 that combines the composite image 301 and the composite image 302. The aggregated composite image 303 includes the visual representations 365a-b corresponding to the locations at which emitted laser pulses reflected off objects in the field of view 140. The laser range finding device 110 can display selectable markings 366a-b associated with each of the visual representations 365a-b. In response to the user 105 selecting one of the selectable markings 366a-b, the laser range finding device 110 displays the calculated distance corresponding to the selectable marking 366a-b selected by the user 105. In yet another example, the visual representations 365a-b are selectable. In this manner, the user is able to choose which of the visual representations 365a-b corresponds to a target in the aggregated composite image 303 is a target intended to be ranged by the user. The user can make said choice by selecting one of the selectable markings 365a-b or visual representations 365a-b.

As stated above, in hand-held applications, the user 105 can introduce jitter between each laser range finding event (e.g., emitted laser pulse 130a). In order to facilitate the user's ability to visually confirm an accurate laser range finding event, the laser range finding device 110 generates an aggregate composite image (e.g., composite image 303 of FIG. 3C). The aggregated composite image 303 is an aggregation of at least two captured images. In particular, the laser range finding device 110 generates composite image 303 by determining an offset between the composite images 301, 302. The determined offset corresponds to movement of the laser range finding device 110 between the laser range finding events corresponding to the composite images 301, 302.

Figure 3D:
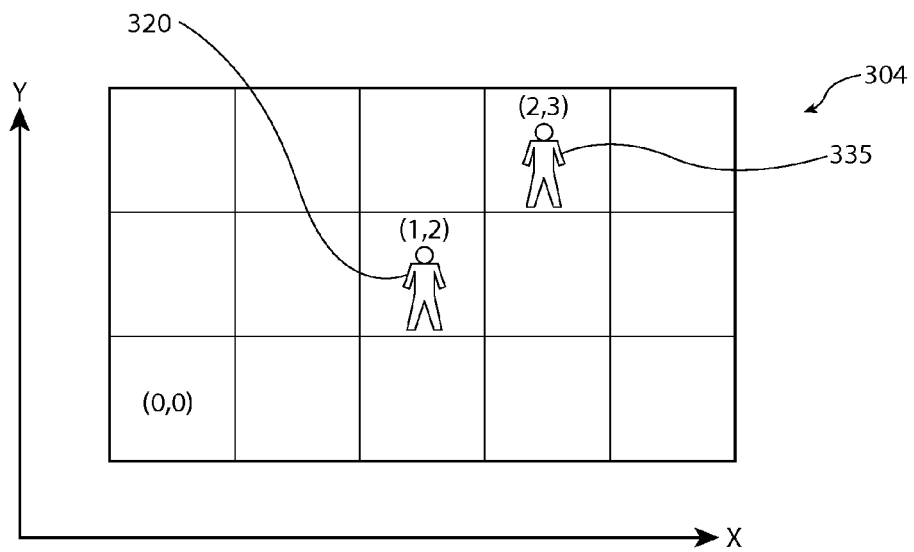
FIGS. 3D-E are illustrations of coordinate systems of respective composite images of FIGS. 3A-B.
Figure 3E:
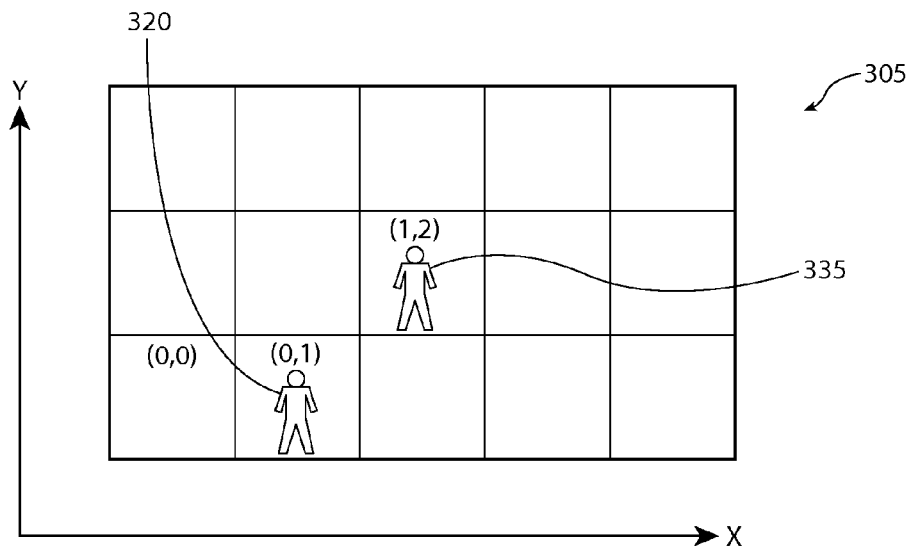

FIGS. 3D-E are illustrations of coordinate systems of two different images having an offset between the coordinate systems due to movement of the laser range finding device 110. FIG. 3D illustrates a coordinate system 304 corresponding to the image 301 of FIG. 3A. FIG. 3E illustrates a coordinate system 305 corresponding to the image 302 of FIG. 3B. As is illustrated in FIG. 3D, the object 320 of the image 301 has a coordinate of (1, 2) with respect to the coordinate system 304 of the image 301. Also, the object 335 of the image 301 has a coordinate of (2, 3). As is illustrated in FIG. 3E, the object 320 has a coordinate of (0, 1) and the object 335 has a coordinate of (1, 2) with respect to the coordinate system of the image 302. In order for the laser range finding device 110 to generate the aggregated composite image 303, the laser range finding device 110 must determine an offset between the coordinate system 304 and the coordinate system 305 of respective images 301, 302. A comparison of the two coordinate systems 304, 305 shows that the coordinate system 305 of image 302 has an offset of (−1, −1) with respect to the coordinate systems 304 of image 301. Object 320 is positioned at coordinate (1, 2) in FIG. 3D and at coordinate (0, 1) in FIG. 3E (offset=(0, 1)−(1, 2)=(−1, −1). Based on information of the offset, the laser range finding is able to generate composite image 303. In an example, the laser range finding device 110 overlays image 302 on top of image 301 using the offset information. The laser range finding device can determine the offset as described herein.

In one example, the laser range finding device 110 can include a sensor (e.g., sensor 570 of FIG. 5) configured to collect information corresponding to movement of the laser range finding device between each laser range finding event (e.g., the capture of at least two images). Using the collected information, the laser range finding device 110 determines an offset between the coordinate systems of the composite images 301, 302. In response to determining the offset, the laser range finding device 110 generates the aggregated composite image 303.

Figure 4:
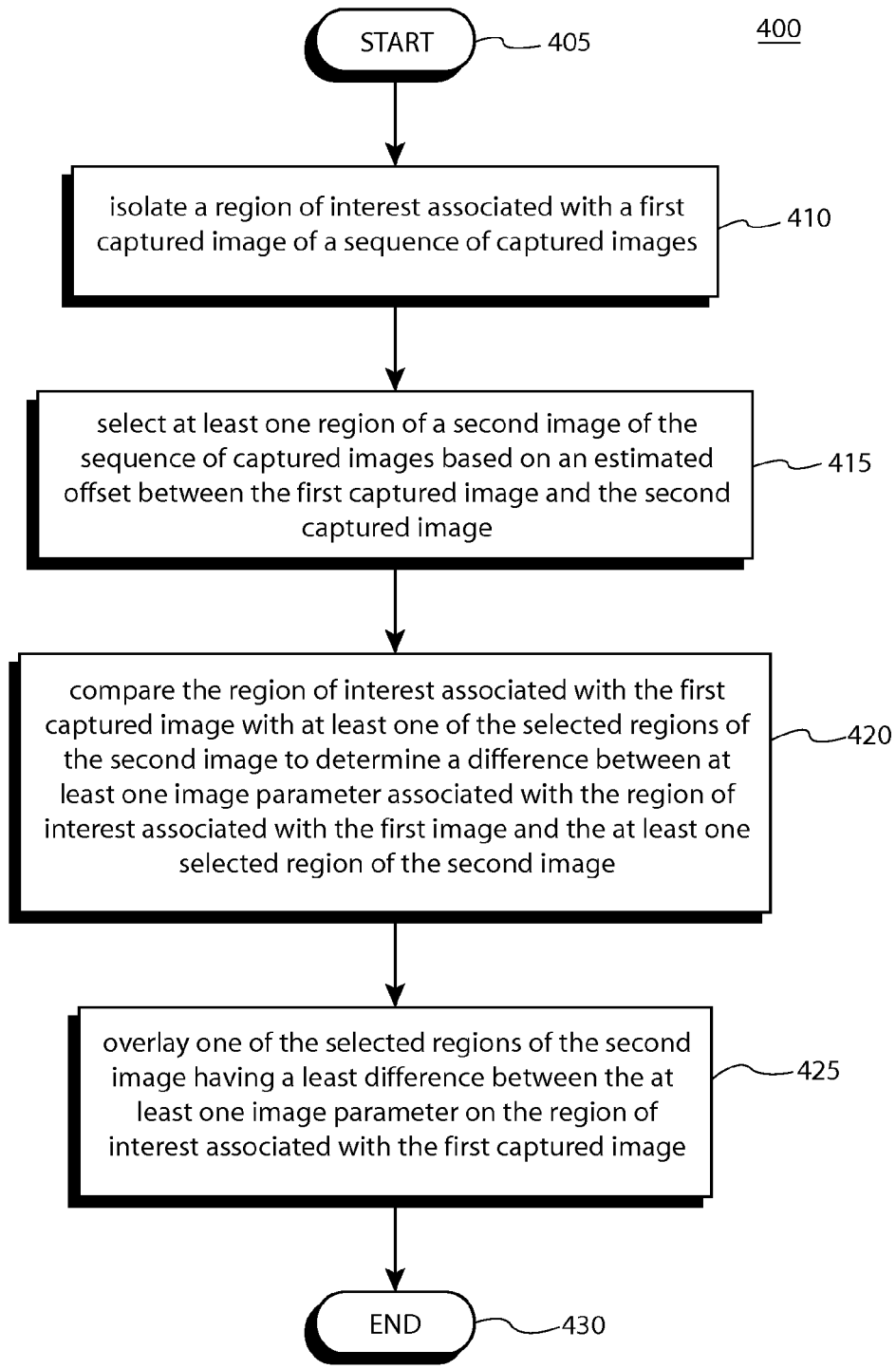
FIG. 4 is a flow diagram of a method for generating an aggregated composite image in accordance with an example embodiment of the present disclosure.

In another example, the laser range finding device 110 determines the offset between the coordinate systems of the composite images 301, 302 using imaging processing. FIG. 4 is a flow diagram of a method 400 for generating an aggregated composite image (e.g., composite image 303 of FIG. 3C). At 405, the method begins. At 410, a mapping processor (e.g., mapping processor of FIG. 5) of the laser range finding device 110 isolates a region of interest associated with a first captured image of a sequence of captured images. For example, the mapping processor isolates a region of interest of a captured image corresponding to composite image 301 of FIG. 3A. The region of interest can be, for example, a region of the field of view 140 surrounding a center of the targeting reticle 145. At 415, the mapping processor selects at least one region of a second image (e.g., a captured image corresponding to composite image 302 of FIG. 3B) of the sequence of images based on an estimated offset between the first captured image and the second captured image. As stated above, the offset between the images is generally due to movement of the laser range finding device 110 between laser range finding events. The movement of the laser range finding device is due to user-induced jitter. The estimated offset can be determined based on empirical data of typical user-induced jitter. For example, in a two dimensional coordinate system, empirical data can indicate that typical user-induced jitter is within a threshold distance from an origin point of the coordinate system corresponding to the first captured image.

At 420, the mapping processor compares the region of interest associated with the first captured image with each of the selected regions of the second image to determine a difference between at least one image parameter (e.g., color and intensity of an image pixel) associated with the region of interest of the first captured image and at least one image parameter associated with each of the selected regions of the second image. For example, the mapping processor compares the region of interest of the first captured image to each region of the second image within the threshold distance from an origin point of a coordinate system corresponding to the second captured image.

At 425, the mapping processor overlays one of the selected regions of the second image having a least difference between the at least one image parameter on the region of interest associated with the first captured image. At 430, the method ends.

Figure 5:
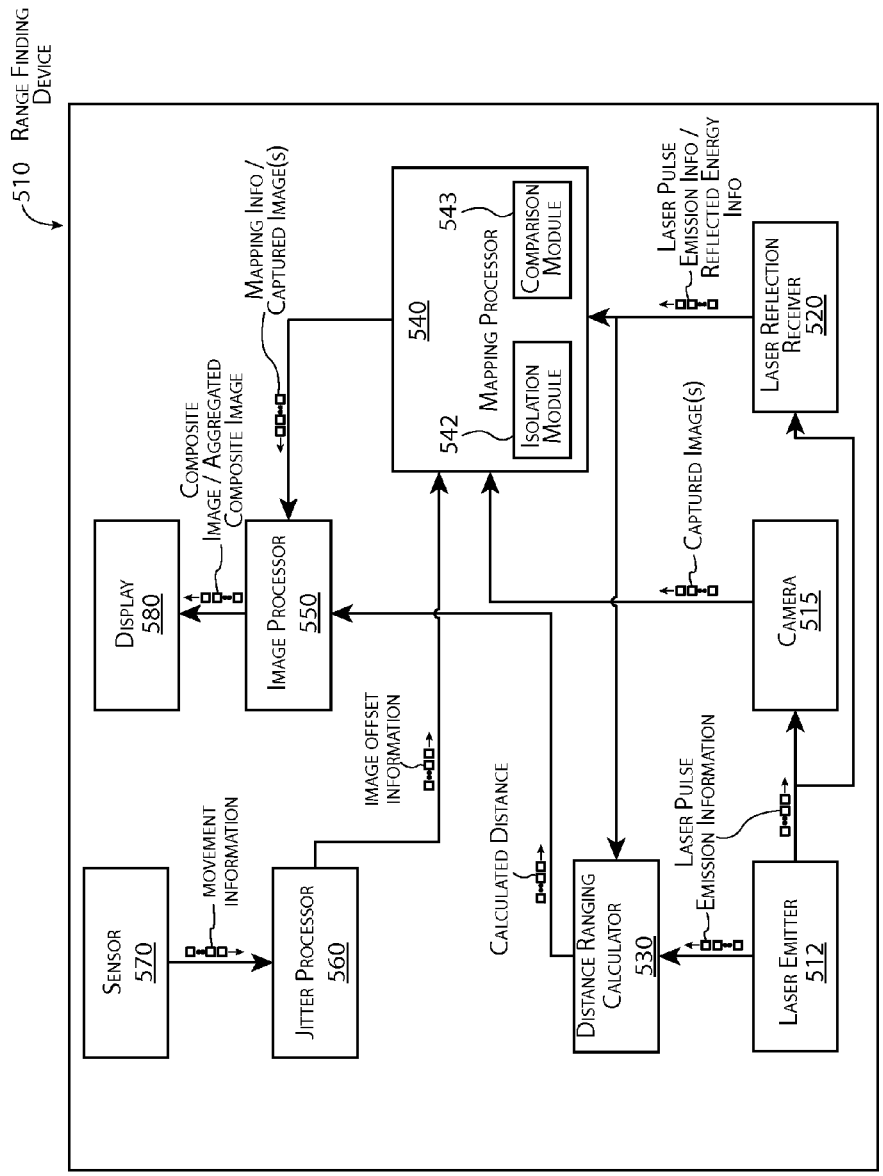
FIG. 5 is a block diagram of an example embodiment of a laser range finding device in accordance with an example embodiment of the present disclosure.

FIG. 5 is a block diagram of an example embodiment of a laser range finding device 510 that includes a laser emitter 512, camera 515, laser reflection receiver 520, distance ranging calculator 530, mapping processor 540, sensor 570, jitter processor 560, image processor 550, and display 580.

In response to a user (e.g., user 105 of FIG. 1) of the laser range finding device 510 initiating a laser range finding event, the laser emitter 512 emits at least one laser pulse (e.g., laser pulse 130a of FIG. 1) toward a target object (e.g., an object of interest in the field of view 140 of FIG. 1). In addition, the laser emitter 512 provides an indication to the laser reflection receiver 520 of the emission of the laser pulse. The laser reflection receiver 520 then receives reflected energy (e.g., reflected energy 130b of FIG. 1) in response to the emitted laser pulse reflecting off a surface of an object in the field of view. Contemporaneous to the laser pulse emission, the camera 515 captures an image of, for example, the field of view 140 of FIG. 1. In particular, the camera captures the field of view that includes a target object (e.g., object 120 of FIG. 1) and the area surrounding the target object (e.g., area 160 of FIG. 1).

The distance ranging calculator 530 receives information associated with the emitted laser pulse and the received reflected energy corresponding to the emitted laser pulse. Based on the information associated with the emission and reflected energy of the at least one laser pulse, the distance ranging calculator 530 calculates the distance between a location of the laser range finding device 110 and an object from which the reflected energy is received.

The mapping processor 540 also receives the information associated with the emitted laser pulse and the received reflected energy corresponding to the emitted laser pulse. In addition, the mapping processor 540 receives the image(s) captured by the camera 515.

Using the received data, the mapping processor maps a location associated with the emitted laser pulse reflecting off an object to a coordinate system of the captured image.

In one example, the mapping processor 540 determines a targeting reticle's coordinate with respect to the coordinate system of the captured image at the time of capturing the image. The mapping processor 540 then uses the targeting reticle's coordinate as the coordinate of the location associated with the at least one laser pulse reflecting off the surface.

In another example, the camera 515 is configured to detect and capture the reflected energy corresponding to the emitted laser pulse reflecting off an object in the field of view of the laser range finding device 510. The mapping processor 540 then determines a coordinate of the location of the reflected energy with respect to the coordinate system of the captured image.

Using information derived by the mapping processor 540 as described above, the image processor 550 generates a composite image for each captured image. The generated composite image includes a visual representation of the laser pulse overlaid on the captured image using the mapping of the location of the laser pulse.

As stated above, the user 105 can cause the laser range finding device 510 to initiate multiple range finding events. However, between each laser range finding event, the laser range finding device 510 can move, due to user-induced jitter, platform movement if the device is in or on a vehicle, or other sources of movement. The sensor 570 collects information corresponding to movement of the laser range finding device between the capture of at least two images corresponding to different range finding events. The sensor 570 passes the collected information to the jitter processor 560. The jitter processor 560 determines an offset between the coordinate systems of the at least two images using the collected information. The image processor 550, using the offset information, then generates an aggregated composite image of the at least two captured images.

In another example, mapping processor 540 includes an isolation module 542 and a comparison module 543 to determine an offset between the coordinate systems of the at least two images. The isolation module 542 isolates a region of interest associated with a first captured image of a sequence of captured images. The comparison module 543 compares the region of interest associated with the first captured image with at least one selected region of the second image to determine a difference between at least one image parameter associated with the region of interest associated with the first image and each of the selected regions of the second image.

The image processor 550 then overlays the selected region of the second image having a least difference between the at least one image parameter on the region of interest associated with the first captured image.

The display 580 then receives image date from the image processor 550 and displays the composite image/aggregated composite image. Also, the display 580 displays calculated distance as calculated by the distance ranging calculator 530 on the composite image with the visual representation of the reflected energy. Further, the display 580 can display a selectable marking a user can select to designate that a source of the reflected energy corresponds to the surface of the target object.

Figure 6A:
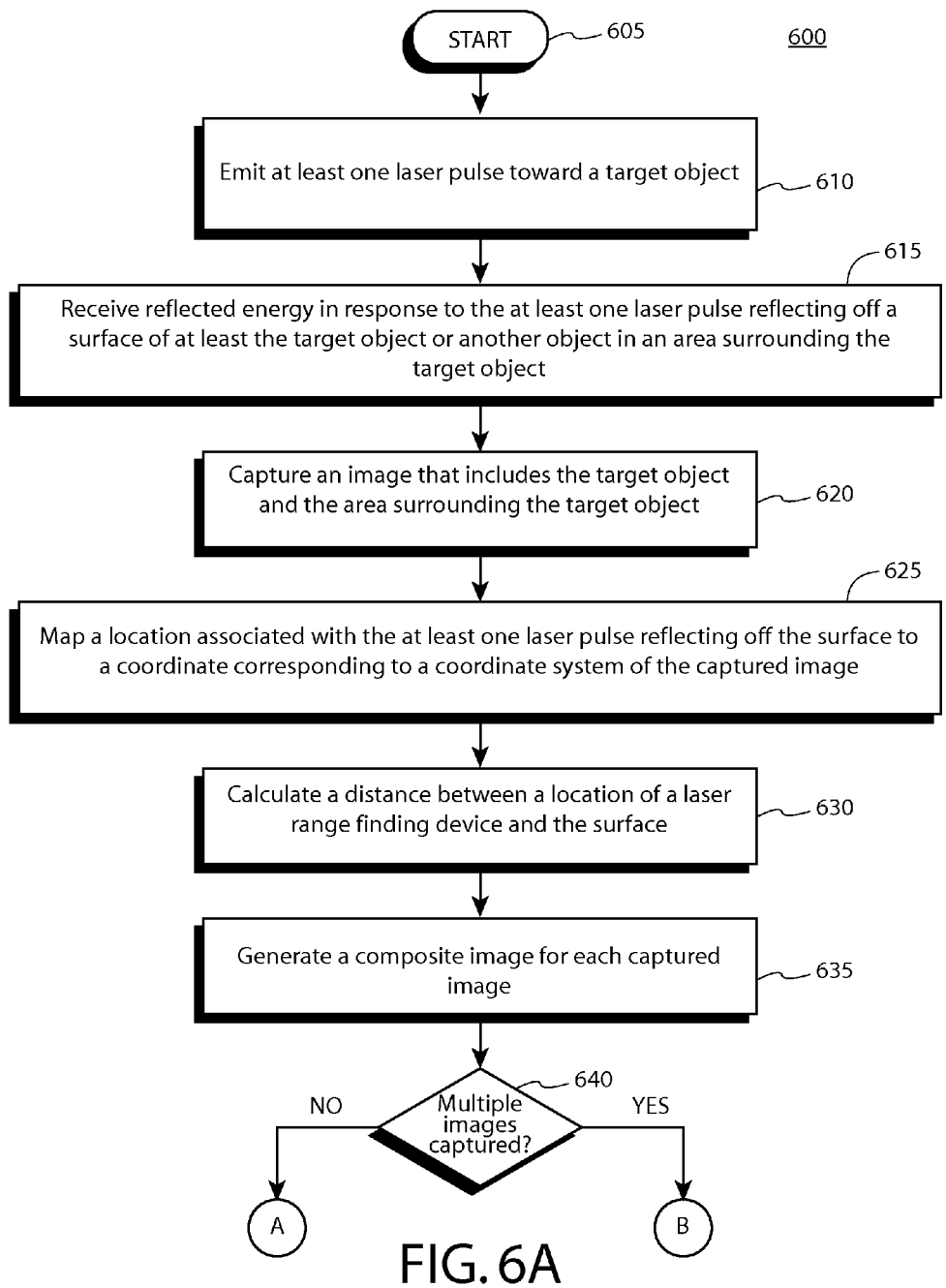
FIGS. 6A-C are flow diagrams of a method for determining a distance of a target object in accordance with an example embodiment of the present disclosure.
Figure 6B:
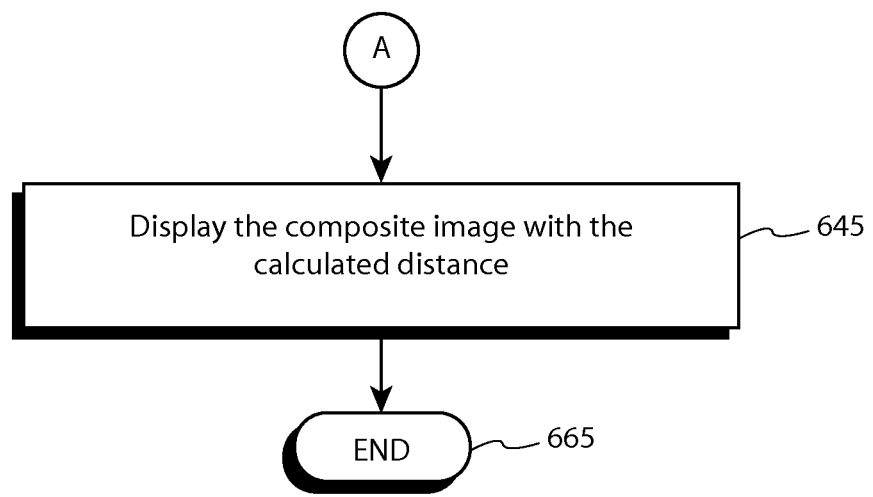
Figure 6C:
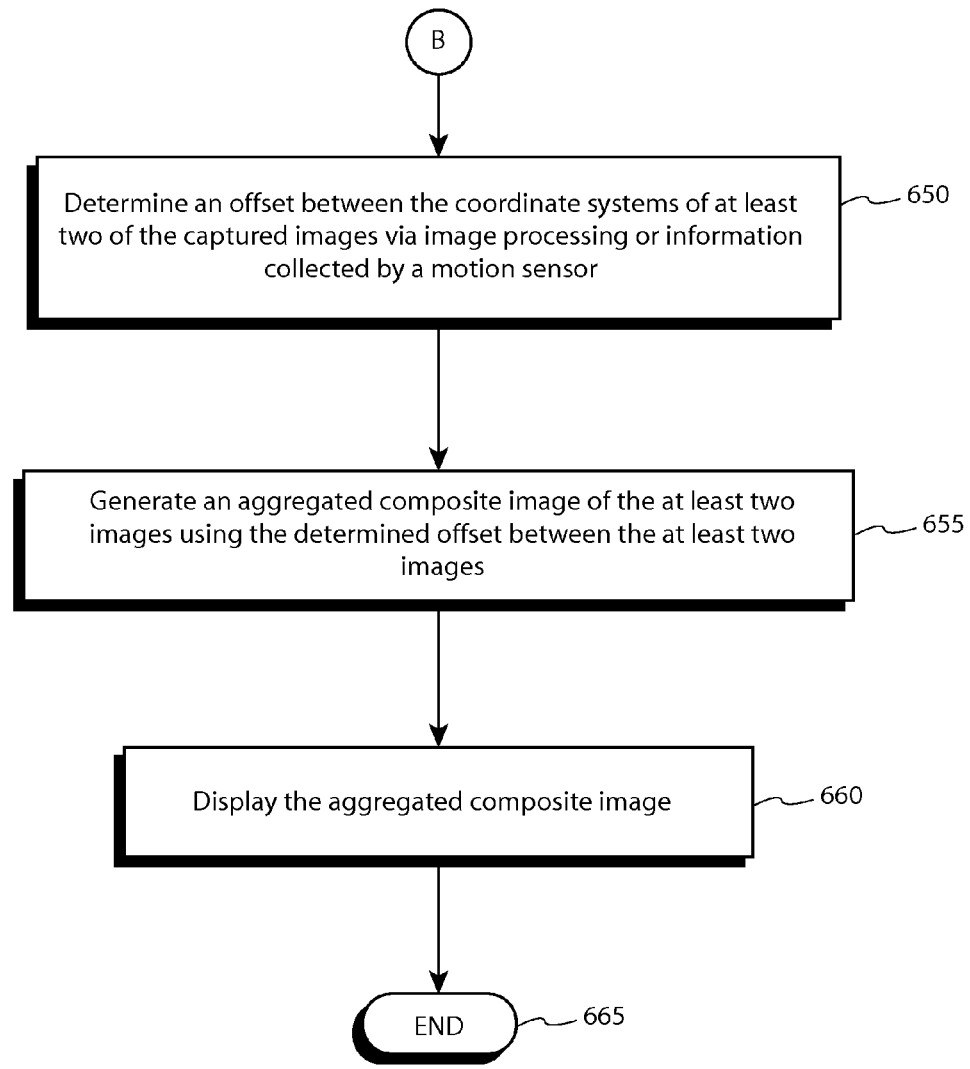

FIGS. 6A-C are flow diagrams of a method 600 for determining the distance of a target object. At 605, the method 600 begins. At 610, a laser range finding device (e.g., laser range finding device 110 of FIG. 1) emits at least one laser pulse (e.g., the laser pulse 130a of FIG. 1) toward a target object (e.g., an object of interest to user 105 of FIG. 1). Subsequent to emitting each of the at least one laser pulse, at 615, the laser range finding device receives reflected energy in response to the emitted laser pulse reflecting off a surface of either the target object or another object surrounding the target object. For each emitted laser pulse, at 630, the laser range finding device captures an image that includes the target object and the area surrounding the target object. Also, the laser range finding device, at 625, maps a location associated with the at least one laser pulse reflecting off the surface to a coordinate corresponding to a coordinate system of the captured image. At 630, the laser range finding device calculates a distance between a location of the laser range finding device and the surface of one of the objects. At 635, the laser range finding device generates a composite image (e.g., composite images 301, 302 of FIG. 3) for each captured image. The generated composite image includes a visual representation of the at least one laser pulse overlaid on the captured image using the mapping of the location of the at least one laser pulse.

At 640, the laser range finding device determines if multiple images are captured (i.e., if the laser range finding device emitted several laser pulses). If not, at 645, the laser range finding device displays the composite image with the calculated distance. If multiple images are captured, at 650, the laser range finding device determines an offset between at least two of the captured images. The laser range finding device determines the offset by, for example, using a sensor (e.g., sensor 570 of FIG. 5). Also, the laser range finding device can determine the offset using image processing, for example, as described in the description above of the flow diagram illustrated in FIG. 4. Using the determined offset, the laser range finding device, at 655, generates an aggregated composite image of the at least two images. At 665, the method ends.

Figure 7:
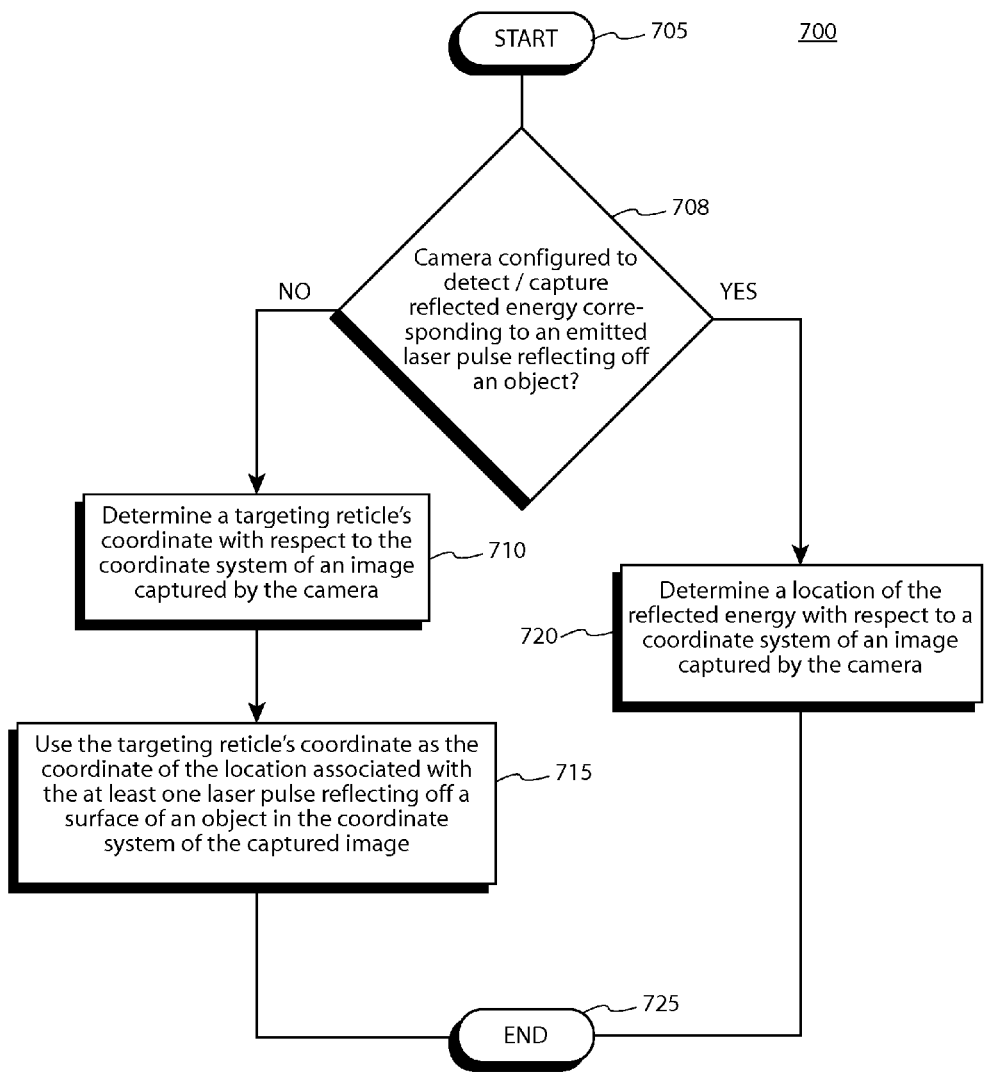
FIG. 7 is a flow diagram of a method for mapping at least one laser pulse reflecting off a surface of an object in a captured image to a coordinate corresponding to a coordinate system of the captured image.

FIG. 7 is a flow diagram of a method 700 for mapping a location associated with at least one laser pulse reflecting off a surface of an object in a captured image to coordinate corresponding to a coordinate system of the captured image. At 705, the method begins. At 708, a mapping processor (e.g., the mapping processor 540 of FIG. 5) of a laser range finding device (e.g., laser range finding device 510 of FIG. 5) determines whether a camera (e.g., camera 515 of FIG. 5) is configured to detect/capture reflected energy corresponding to an emitted laser pulse reflecting off an object.

If not, at 710, mapping processor determines a targeting reticle's (e.g., targeting reticle 145 of FIG. 1) coordinate with respect to the coordinate system of the captured image. The mapping processor, at 715, then uses the targeting reticle's coordinate as the location associated with the laser pulse reflecting off the object in the coordinate system of the captured image.

If, on the other hand, the mapping processor determines that the camera is configured to detect/capture the reflected energy, at 720, the mapping processor analyzes the image to determine the location of the reflected energy with respect to a coordinate system of the captured image. At 725, the method ends.

Further example embodiments of the present disclosure can be configured using a computer program product; for example, controls can be programmed in software for implementing example embodiments of the present disclosure. Further example embodiments of the present disclosure can include a non-transitory computer readable medium containing instruction that can be executed by a processor, and, when executed, cause the processor to complete methods described herein. It should be understood that elements of the block and flow diagrams described herein can be implemented in software, hardware, firmware, or other similar implementation determined in the future. In addition, the elements of the block and flow diagrams described herein can be combined or divided in any manner in software, hardware, or firmware. If implemented in software, the software can be written in any language that can support the example embodiments disclosed herein. The software can be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams can include more or fewer elements, be arranged or oriented differently, or be represented differently. It should be understood that implementation can dictate the block, flow, and/or network diagrams and the number of block and flow diagrams illustrating the execution of embodiments of the disclosure While this present disclosure has been particularly shown and described with references to example embodiments thereof, it will be understood by those skilled in the art that various changes in form and details can be made therein without departing from the scope of the present disclosure encompassed by the appended claims.

What is claimed is:

1. A method for determining a distance to a target object using a laser range finding device, the method comprising:

emitting at least one laser pulse toward the target object;

receiving reflected energy in response to the at least one laser pulse reflecting off a surface, the surface being associated with at least the target object or another object in an area surrounding the target object;

capturing an image that includes the target object and the area surrounding the target object;

mapping a location associated with the at least one laser pulse reflecting off the surface to a coordinate corresponding to a coordinate system of the captured image;

generating a composite image for each captured image, the composite image including a visual representation of the at least one laser pulse overlaid on the captured image using the mapping of the location of the at least one laser pulse;

collecting information corresponding to movement of the laser range finding device between the capture of at least two images, wherein the information is collected via at least one of the following: motion sensors and image processing;

determining an offset between the coordinate systems of the at least two images using the collected information;

generating an aggregated composite image of the at least two images using the determined offset between the at least two images; and displaying the aggregated composite image with a selectable marking, for each of the at least two images, a user can select to designate that a source of the reflected energy corresponds to the surface of the target object.

2. The method of claim 1 further comprising displaying the composite image.

3. The method of claim 1 further comprising:
based on information associated with the emission and reflected energy of the at least one laser pulse, calculating a distance between a geographical location of the laser range finding device and a geographical location of the surface; and
displaying the calculated distance on the composite image with the visual representation of the reflection.

4. The method of claim 1 wherein mapping includes:
determining a targeting reticle's coordinate with respect to the coordinate system of the captured image at the time of capturing the image, wherein the targeting reticle is used to aim the laser range finding device toward the target object; and
using the targeting reticle's coordinate as the coordinate of the location associated with the at least one laser pulse reflecting off the surface.

5. The method of claim 1 further comprising:
wherein the captured image further includes an image of the at least one laser pulse reflecting off the surface; and
determining a coordinate of a location of the at least one laser pulse reflecting off the surface with respect to the coordinate system of the captured image.

6. The method of claim 1 further comprising displaying the composite image with a selectable marking a user can select to designate that a source of the reflected energy corresponds to the surface of the target object.

7. The method of claim 1 further comprising displaying the aggregated composite image.

8. The method of claim 1 further comprising:
isolating a region of interest associated with a first captured image of a sequence of captured images;
comparing the region of interest associated with the first captured image with at least one selected region of the second image to determine a difference between at least one image parameter associated with the region of interest associated with the first image and the at least one selected region of the second image, the at least one selected region of the second image being selected based on an estimated offset between the first captured image and the second captured image, the estimated offset associated with movement of the laser range finding corresponding to movement of the laser range finding device between the capture of the first captured image and the second captured image; and
overlaying one of the at least one selected region of the second image having a least difference between the at least one image parameter on the region of interest associated with the first captured image.

9. A laser range finding device for determining a distance to a target object, the laser range finding device comprising:
a laser emitter configured to emit at least one laser pulse toward the target object;
a laser reflection receiver configured to receive reflected energy in response to the at least one laser pulse reflecting off a surface, the surface being associated with at least the target object or another object in an area surrounding the target object;
a camera configured to capture an image that includes the target object and the area surrounding the target object;
a mapping processor configured to map a location associated with the at least one laser pulse reflecting off the surface to a coordinate corresponding to a coordinate system of the captured image;
an image processor configured to generate a composite image for each captured image, the composite image including a visual representation of the at least one laser pulse overlaid on the captured image using the mapping of the location of the at least one laser pulse;
a sensor configured to collect information corresponding to movement of the laser range finding device between the capture of at least two images;
a jitter processor configured to determine an offset between the coordinate systems of the at least two images using the collected information;
wherein the image processor is further configured to generate an aggregated composite image of the at least two images using the determined offset between the at least two images; and
a display configured to display the aggregated composite image with a selectable marking, for each of the at least two images, a user can select to designate that a source of the reflected energy corresponds to the surface of the target object.

10. The laser range finding device of claim 9 further comprising a display configured to display the composite image.

11. The laser range finding device of claim 9 further comprising:
a distance ranging calculator configured to, based on information associated with the emission and reflected energy of the at least one laser pulse, calculate a distance between a geographical location of the laser range finding device and a geographical location of the surface; and
a display configured to display the calculated distance on the composite image with the visual representation of the reflection.

12. The laser range finding device of claim 9 wherein the mapping processor is further configured to:
determine a targeting reticle's coordinate with respect to the coordinate system of the captured image at the time of capturing the image, wherein the targeting reticle is used to aim the laser range finding device toward the target object; and
use the targeting reticle's coordinate as the coordinate of the location associated with the at least one laser pulse reflecting off the surface.

13. The laser range finding device of claim 9 wherein the camera is further configured to detect and capture a representation of the at least one laser pulse reflecting off the surface and wherein the mapping processor is further configured to determine a coordinate of a location of the representation with respect to the coordinate system of the captured image.

14. The laser range finding device of claim 9 wherein the display is further configured to display a selectable marking a user can select to designate that a source of the reflected energy corresponds to the surface of the target object.

15. The laser range finding device of claim 9 further comprising a display for displaying the aggregated composite image.

16. The laser range finding device of claim 9 wherein the mapping processor further includes:
an isolation module configured to isolating a region of interest associated with a first captured image of a sequence of captured images;
a comparison module configured to comparing the region of interest associated with the first captured image with at least one selected region of the second image to determine a difference between at least one image parameter associated with the region of interest associated with the first image and the at least one selected region of the second image, the at least one selected region of the second image being selected based on an estimated offset between the first captured image and the second captured image, the estimated offset associated with movement of the laser range finding corresponding to movement of the laser range finding device between the capture of the first captured image and the second captured image; and wherein the image processor is further configured to overlay one of the at least one selected region of the second image having a least difference between the at least one image parameter on the region of interest associated with the first captured image.

17. A non-transitory computer readable medium having computer readable program codes embodied thereon for determining a distance to a target object, the computer readable program codes including instructions that, when executed by a processor, cause the processor to:

map a location associated with at least one laser pulse reflecting off a surface to a coordinate corresponding to a coordinate system of a captured image, wherein the surface is associated with at least the target object or another object in an area surrounding the target object and wherein the captured image includes at least the target object and the area surrounding the target object;

generate a composite image for each captured image, the composite image including a visual representation of the at least one laser pulse overlaid on the captured image using the mapping of the location of the at least one laser pulse reflecting off the surface;

collect information corresponding to movement of the laser range finding device between the capture of at least two images, wherein the information is collected via at least one of the following: motion sensors and image processing;

determine an offset between the coordinate systems of the at least two images using the collected information;

generate an aggregated composite image of the at least two images using the determined offset between the at least two images; and display the aggregated composite image with a selectable marking, for each of the at least two images, a user can select to designate that a source of the reflected energy corresponds to the surface of the target object.

* * * * *